(12) United States Patent
Huang et al.

(10) Patent No.: US 11,572,631 B2
(45) Date of Patent: Feb. 7, 2023

(54) METHOD FOR ELECTROLYSIS OF WATER

(71) Applicants: National Tsing Hua University, Hsinchu (TW); Chang Chun Plastics Co., Ltd., Taipei (TW); Chang Chun Petrochemical Co., Ltd., Taipei (TW); DAIREN CHEMICAL CORP., Taipei (TW)

(72) Inventors: Chun-Lun Huang, Hsinchu (TW); Shih-Yuan Lu, Hsinchu (TW)

(73) Assignees: National Tsing Hua University, Hsinchu (TW); Chang Chun Plastics Co., Ltd., Taipei (TW); Chang Chun Petrochemical Co., Ltd., Taipei (TW); DAIREN CHEMICAL CORP., Taipei (TW)

( * ) Notice: Subject to any disclaimer, the term of this patent is extended or adjusted under 35 U.S.C. 154(b) by 0 days.

(21) Appl. No.: 17/482,383

(22) Filed: Sep. 22, 2021

(65) Prior Publication Data

US 2022/0010441 A1    Jan. 13, 2022

Related U.S. Application Data

(62) Division of application No. 16/819,149, filed on Mar. 15, 2020, now Pat. No. 11,359,297.

(30) Foreign Application Priority Data

Jan. 9, 2020 (TW) ................. 109100708

(51) Int. Cl.
*C25B 1/04* (2021.01)
*C22C 30/02* (2006.01)
*C25B 11/091* (2021.01)
*C25D 3/56* (2006.01)
*C25B 11/031* (2021.01)

(Continued)

(52) U.S. Cl.
CPC ............ *C25B 11/091* (2021.01); *C22C 30/02* (2013.01); *C25B 1/04* (2013.01); *C25B 11/031* (2021.01); *C25B 11/051* (2021.01); *C25B 11/057* (2021.01); *C25D 3/56* (2013.01)

(58) Field of Classification Search
None
See application file for complete search history.

(56) References Cited

FOREIGN PATENT DOCUMENTS

| | | |
|---|---|---|
| CN | 107587158 | 1/2018 |
| CN | 108728876 | 11/2018 |
| CN | 108796535 | 11/2018 |

(Continued)

OTHER PUBLICATIONS

Kang et al. (CN 107587158 A, machine translation). (Year: 2018).*

(Continued)

*Primary Examiner* — Wojciech Haske
(74) *Attorney, Agent, or Firm* — JCIPRNET

(57) ABSTRACT

A method for electrolysis of water and a method for preparing a catalyst for electrolysis of water are provided. The method for electrolysis of water includes using a high entropy alloy as a catalyst. Further, the method for preparing a catalyst for electrolysis of water includes the steps of placing a substrate in an aqueous electrolyte containing a high entropy alloy precursor and performing an electroplating process on the substrate to form a high entropy alloy catalyst on the substrate.

3 Claims, 5 Drawing Sheets

Put a substrate into an aqueous electrolyte containing a high entropy alloy precursor — 200

Performing an electroplating process on the substrate so as to form the high entropy alloy catalyst on the substrate — 202

(51) Int. Cl.
*C25B 11/051* (2021.01)
*C25B 11/057* (2021.01)

(56) References Cited

FOREIGN PATENT DOCUMENTS

| | | |
|---|---|---|
| CN | 109999830 | 7/2019 |
| CN | 110339850 | 10/2019 |
| CN | 112609213 | 4/2021 |

OTHER PUBLICATIONS

Office Action of China Counterpart Application, dated Dec. 24, 2021, pp. 1-9.
Weiji Dai et al., "Novel and promising electrocatalyst for oxygen evolution reaction based on MnFeCoNi high entropy alloy", Journal of Power Sources, vol. 430, May 16, 2019, pp. 104-111.
Wang Guoqing et al., "Effect of Deposition Current on Electrocatalytic Properties of Ni—Mo—Co Coated Electrodes for Hydrogen Evolution", Chinese Journal of Rare Metals, vol. 34, Issue 5, Sep. 15, 2010, with English abstract, pp. 712-716.
Matthew W. Glasscott et al., "Electrosynthesis of high-entropy metallic glass nanoparticles for designer, multi-functional electrocatalysis", Nature Communications, vol. 10, Jun. 14, 2019, pp. 1-8.

* cited by examiner

METHOD FOR ELECTROLYSIS OF WATER

CROSS-REFERENCE TO RELATED APPLICATION

This application is a divisional application of and claims the priority benefit of U.S. application Ser. No. 16/819,149, filed on Mar. 15, 2020, which claims the priority benefit of Taiwan application serial no. 109100708, filed on Jan. 9, 2020. The entirety of the above-mentioned patent applications are hereby incorporated by reference herein and made a part of this specification.

BACKGROUND OF THE INVENTION

1. Field of the Invention

The invention relates to a method for electrolysis of water and a method for preparing catalysts for electrolysis of water.

2. Description of Related Art

In the present chemical industry, synthesis of hydrocarbon compounds often requires hydrogen to participate in the relevant reaction, and fossil fuel is generally used as a raw material for hydrogen production. The present most popular and economical commercial process for $H_2$ production is steam-methane reforming, which uses fossil fuels as the raw material and generates $CO_2$ as the by-product. It is definitely an environmental unfriendly and a non-sustainable $H_2$ production process, and development of green $H_2$ production is in urgent need.

SUMMARY OF THE INVENTION

The invention provides a method for electrolysis of water. According to the method, a high entropy alloy is used as a catalyst.

The invention provides a method for preparing catalysts for electrolysis of water. According to the method, an electroplating process is performed to form a high entropy alloy catalyst on a substrate.

According to the method of the invention for electrolysis of water, the high entropy alloy is used as the catalyst.

In an embodiment of the method for electrolysis of water of the invention, the high entropy alloy is, for example, composed of iron, cobalt, nickel, copper and molybdenum. On the basis of a total mole number of the high entropy alloy, a content of each of iron, cobalt, nickel, copper and molybdenum is, for example, in a range of 5 to 35 at. %.

In an embodiment of the method for electrolysis of water of the invention, the high entropy alloy is, for example, composed of iron, cobalt, nickel, copper, molybdenum and manganese. On the basis of a total mole number of the high entropy alloy, a content of each of iron, cobalt, nickel, copper, molybdenum and manganese is, for example, in a range of 5 to 35 at. %.

In an embodiment of the method for electrolysis of water of the invention, for example, an aqueous solution with a pH value of 7 to 14 is used as an electrolyte for application of an anode.

In an embodiment of the method for electrolysis of water of the invention, for example, an aqueous solution with a pH value of 0 to 14 is used as an electrolyte for application of a cathode.

The method for preparing a catalyst for electrolysis of water of the invention includes the following steps. A substrate is placed in an aqueous electrolyte containing a high entropy alloy precursor. An electroplating process is performed on the substrate to form a high entropy alloy catalyst on the substrate.

In an embodiment of the method for preparing a catalyst for electrolysis of water of the invention, the high entropy alloy precursor is, for example, composed of ferric chloride, cobalt chloride, nickel chloride, cupric chloride and ammonium molybdate.

In an embodiment of the method for preparing a catalyst for electrolysis of water of the invention, the high entropy alloy precursor is, for example, composed of manganese chloride, ferric chloride, cobalt chloride, nickel chloride, cupric chloride and ammonium molybdate.

In an embodiment of the method for preparing a catalyst for electrolysis of water of the invention, a current density of the electroplating process is, for example, in a range of 2 to 6 $A/cm^2$.

In an embodiment of the method for preparing a catalyst for electrolysis of water of the invention, the substrate is, for example, a porous substrate.

Based on the above, the high entropy alloy is used as the catalyst for electrolysis of water in the invention, so that overpotential required by water electrolysis can be effectively reduced, and electric energy consumption is substantially reduced. Additionally, in the invention, the high entropy alloy catalyst is formed by the electroplating process, so that preparation steps of the high entropy alloy catalyst can be simplified, and preparation cost can be reduced. The formed high entropy alloy catalyst may have a high surface area, and water electrolysis efficiency can be effectively improved.

To make the foregoing features and advantages of the present disclosure more comprehensible, a detailed description is made below with reference to the accompanying drawings by using embodiments.

DESCRIPTION OF THE EMBODIMENTS

Hereafter, a high entropy alloy generally refers to a five-element alloy, a six-element alloy or multi-element (more than six elements) alloy, and a content of each metal element is in a range of 5 to 35 at. %. That is, these metal elements are all main components of the high entropy alloy, and the high entropy alloy may also include other trace elements.

In the invention, the high entropy alloy is used as a catalyst for electrolysis of water. Overpotential required by water electrolysis can be reduced, so that electric energy consumption is reduced. Additionally, fossil fuel is not needed to be used as a hydrogen production raw material, so that emission of carbon dioxide can be effectively reduced.

Additionally, in the invention, the above high entropy alloy catalyst is formed on a substrate through an electroplating process, so that preparation steps of the high entropy alloy catalyst can be simplified, and preparation cost can be reduced. In addition, the high entropy alloy catalyst is formed by the electroplating process, so that the high entropy alloy catalyst can have a three-dimensional structure and thus have a high surface area, and water electrolysis efficiency can be effectively improved.

A method for electrolysis of water and a method for preparing catalysts of the invention are respectively illustrated hereafter.

Figure 1:
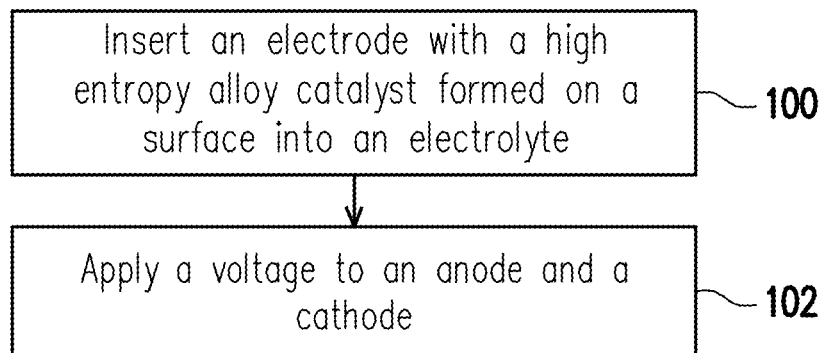
FIG. 1 is a flow diagram of a method for electrolysis of water drawn according to an embodiment of the invention.

FIG. 1 is a flow diagram of a method for electrolysis of water drawn according to an embodiment of the invention. Referring to FIG. 1, in a step 100, an electrode with a high entropy alloy catalyst formed on the surface is inserted into an electrolyte. In the present embodiment, the five-element high entropy alloy and the six-element high entropy alloy are respectively used as a catalyst for electrolysis of water, but the invention is not limited thereto. In other embodiments, the multi-element (more than six elements) high entropy alloy can be used as the catalyst for electrolysis of water.

Under the condition of using the five-element high entropy alloy as the catalyst for electrolysis of water, the high entropy alloy including iron, cobalt, nickel, copper and molybdenum as main components can be used, but the invention is not limited thereto. On the basis of a total mole number of the five-element high entropy alloy, a content of each of iron, cobalt, nickel, copper and molybdenum is in a range of 5 to 35 at. %. Preferably, iron, cobalt, nickel, copper and molybdenum exist in the five-element high entropy alloy according to a molar proportion of 1:1:1:1:1. Under this condition, the five-element high entropy alloy catalyst does not include a noble metal, so that production cost can be reduced, and commercialization is facilitated.

Under the condition of using the six-element high entropy alloy as the catalyst for electrolysis of water, the high entropy alloy including manganese, iron, cobalt, nickel, copper and molybdenum as main components can be used, but the invention is not limited thereto. On the basis of a total mole number of the six-element high entropy alloy, a content of each of manganese, iron, cobalt, nickel, copper and molybdenum is in a range of 5 to 35 at. %. Preferably, manganese, iron, cobalt, nickel, copper and molybdenum exist in the six-element high entropy alloy according to a molar proportion of 1:1:1:1:1:1. Under this condition, the six-element high entropy alloy catalyst does not include a noble metal, so that production cost can be reduced, and commercialization is facilitated.

Additionally, in the present embodiment, an anode and a cathode are respectively inserted into different electrolytes. In detail, the anode is inserted into an aqueous solution with a pH value of 7 to 14, and the cathode is inserted into an aqueous solution with a pH value of 0 to 14. However, the invention is not limited thereto. In other embodiments, the anode and the cathode are inserted into an aqueous solution with the pH value of 7 to 14.

In a step 102, a voltage is applied onto the anode and the cathode, so that an oxidation reaction occurs at the anode, and a reduction reaction occurs at the cathode. At the moment, oxygen gas is produced at the anode, and hydrogen gas is produced at the cathode. With the present method, fossil fuel is not needed to be used as a hydrogen production raw material. Therefore, carbon emission caused by generation of carbon dioxide can be avoided. Additionally, with the high entropy alloy catalyst, the overpotential required by water electrolysis can be effectively reduced, and an effect of reducing the electric energy consumption is achieved.

The effects brought by the present embodiment will be illustrated hereafter by experimental examples.

Experimental Example 1

The five-element high entropy alloy including iron, cobalt, nickel, copper and molybdenum as main components is used as the catalyst, and 1 M of potassium hydroxide aqueous solution is used as the electrolyte for performing water electrolysis.

A three-electrode system is used, a CV (cyclic voltammetry) method is used to confirm redox peak positions before electrochemical polarization curve measurements of HER (hydrogen evolution reaction) and OER (oxygen evolution reaction), and meanwhile, the system is enabled to reach a stable state at the same time to perform subsequent experimental steps.

For OER and HER measurements in alkaline media, a CV scanning range is 0 to 1 V (vs. Hg/HgO electrode) and −0.8 to −1.5 V (vs. Hg/HgO electrode), respectively. For HER measurements in acidic media, the CV scanning range is −0.5 to −1.5 V (vs. Hg/HgO electrode), a scan rate is 100 mV/s, a scanning cycle number is 20, and the sensitivity is 0.1 A/V. The system can perform overpotential measurements of OER and HER catalysts only after the CV operation is completed. An iR compensated LSV (iR compensated linear sweep voltammetry) method is used for measuring the overpotential, and the scanning range and the sensitivity are identical to those of the CV operation in a previous step, but the scan rate is reduced to 0.5 mV/s, so that the overpotential of each point is enabled to reach a steady state.

After the measurement, at a low current density of 10 $mA/cm^2$, the OER overpotential is 215 mV, and the HER overpotential is −10 mV (comparable to a platinum catalyst). At a high current density of 500 $mA/cm^2$, the OER overpotential is 292 mV, and the HER overpotential is −144 mV. Therefore, the method for electrolysis of water of the present embodiment can effectively lower the overpotential required during water electrolysis, so that electric energy consumption can be effectively reduced.

Experimental Example 2

The six-element high entropy alloy including manganese, iron, cobalt, nickel, copper and molybdenum as main components is used as the catalyst, and 1 M potassium hydroxide water solution is used as the electrolyte for performing water electrolysis. Experimental steps and measurements identical to the experimental example 1 are performed.

For OER and HER measurements in alkaline media, a CV scanning range is 0 to 1 V (vs. Hg/HgO electrode) and −0.8 to −1.5 V (vs. Hg/HgO electrode), respectively. For HER measurements in acidic media, the CV scanning range is −0.5 to −1.5 V (vs. Hg/HgO electrode), a scan rate is 100 mV/s, a scanning cycle number is 20, and the sensitivity is 0.1 A/V. The system can perform overpotential measurements of OER and HER catalysts only after the CV operation is completed. An iR compensated LSV (iR compensated linear sweep voltammetry) method is used for measuring the overpotential, and the scanning range and the sensitivity are identical to those of the CV method in a previous step, but the scan rate is reduced to 0.5 mV/s, so that the overpotential of each point is enabled to reach a steady state.

After the measurement, at a low current density of 10 mA/cm$^2$ in alkaline media, the OER overpotential is 201 mV, and the HER overpotential is −16 mV. At a high current density of 500 mA/cm$^2$ in alkaline media, the OER overpotential is 282 mV, and the HER overpotential is −159 mV. Therefore, the method for electrolysis of water of the present embodiment can effectively lower the overpotential required during water electrolysis, so that electric energy consumption can be effectively reduced.

Additionally, the above five-element high entropy alloy catalyst and the six-element high entropy alloy catalyst also exhibit excellent electrochemical performances under the condition of using 0.5 M sulfuric acid aqueous solution as the electrolyte. For example, by using the above five-element high entropy alloy and using the 0.5 M sulfuric acid aqueous solution as the electrolyte, under the condition of the current density of 10 mA/cm$^2$, the HER overpotential is only −10 mV. By using the above six-element high entropy alloy and using the 0.5 M sulfuric acid aqueous solution as the electrolyte, under the condition of the current density of 10 mA/cm$^2$, the HER overpotential is only −15 mV.

A method for preparing a high entropy alloy catalyst will be illustrated hereafter.

Figure 2:
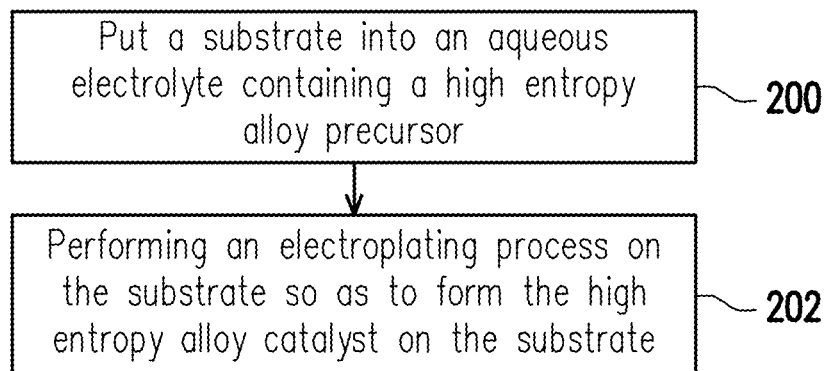
FIG. 2 is a flow diagram of a method for preparing a high entropy alloy catalyst drawn according to an embodiment of the invention.

FIG. 2 is a flow diagram of a method for preparing a high entropy alloy catalyst drawn according to an embodiment of the invention. Referring to FIG. 2, in a step 200, a substrate is put into an aqueous electrolyte containing a high entropy alloy precursor. In the present embodiment, the substrate is a porous substrate, for example, a metal foam. Additionally, in the present embodiment, the aqueous electrolyte containing a five-element high entropy alloy precursor and the aqueous electrolyte containing a six-element high entropy alloy precursor are respectively used, but the invention is not limited thereto. In other embodiments, an aqueous electrolyte containing a multi-element (more than six elements) high entropy alloy precursor can also be used.

Under the condition of using the aqueous electrolyte containing the five-element high entropy alloy precursor, the contained five-element high entropy alloy precursor may be (but not limited to) ferric chloride, cobalt chloride, nickel chloride, cupric chloride and ammonium molybdate, and a chelating agent maybe added according to circumstances.

Under the condition of using the aqueous electrolyte containing the six-element high entropy alloy precursor, the contained six-element high entropy alloy precursor may be (but not limited to) manganese chloride, ferric chloride, cobalt chloride, nickel chloride, cupric chloride and ammonium molybdate, and the chelating agent maybe added according to circumstances.

In a step 202, the substrate is subjected to an electroplating process so as to form the high entropy alloy catalyst on the substrate. Therefore, the substrate with the high entropy alloy catalyst formed on the surface can be used as an anode and a cathode during water electrolysis. In the present embodiment, the current density of the electroplating process is, for example, in a range of 2 to 6 A/cm$^2$.

In the present embodiment, the high entropy alloy catalyst is formed onto the substrate through the electroplating process, so that preparation steps of the high entropy alloy catalyst are simplified, and the preparation cost is low. Additionally, on the basis of characteristics of the electroplating process, the formed high entropy alloy catalyst can have a three-dimensional structure and thus have a high surface area, so that the water electrolysis efficiency can be effectively improved.

The method for preparing a high entropy alloy catalyst will be illustrated hereafter by experimental examples.

Experimental Example 3

A nickel foam (with a pore density being 100 PPI) is put into the aqueous electrolyte containing the five-element high entropy alloy precursor. Various high entropy alloy precursors in the aqueous electrolyte are respectively ferric chloride (0.3 M), cobalt chloride (0.2 M), nickel chloride (0.5 M), cupric chloride (0.005 M) and ammonium molybdate (0.045 M), and additionally, sodium citrate (0.4 M) is added to be used as the chelating agent.

The pH value of the electrolyte is regulated to 9 by ammonium hydroxide. A two-electrode electroplating method is used for performing pulse electroplating, wherein a current density is 4 A/cm$^2$, an electroplating cycle number is 3000, the electroplating on time is 0.2 second, and the current off time is 0.8 second. After the electroplating is completed, deionized water and acetone are used for cleaning a test block.

Figure 3:
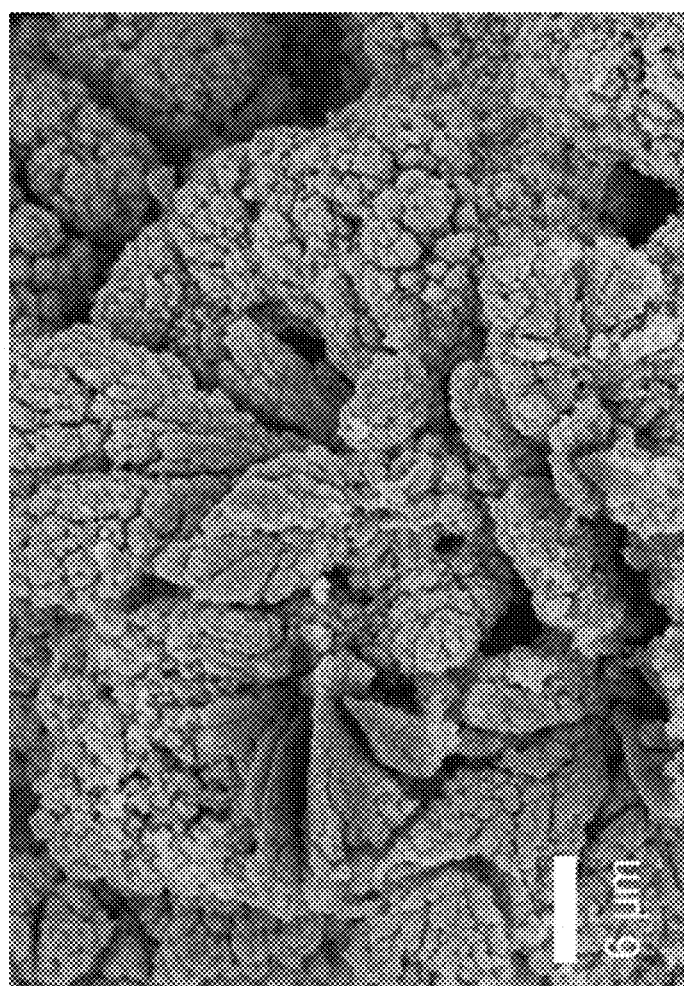
FIG. 3 is an SEM (Scanning Electron Microscope) image of a five-element high entropy alloy catalyst of an experimental example 3.
Figure 3:
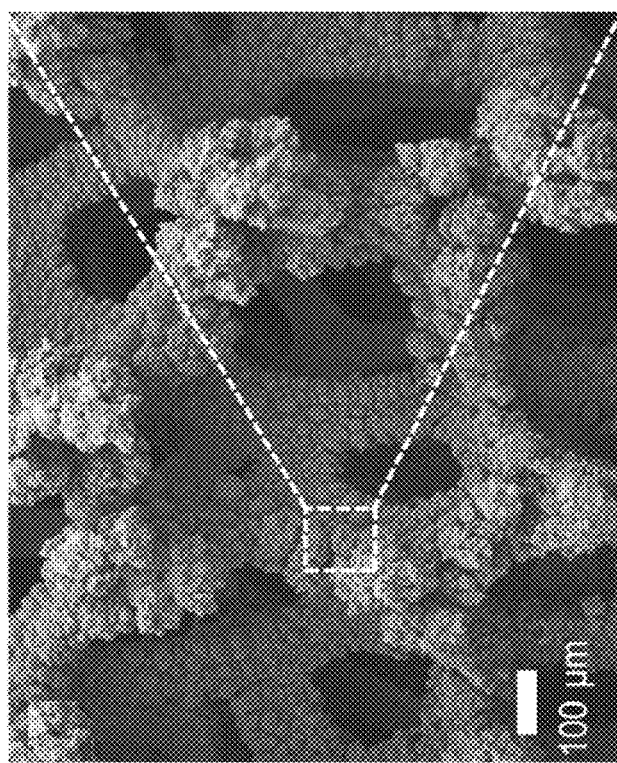
Figure 4:
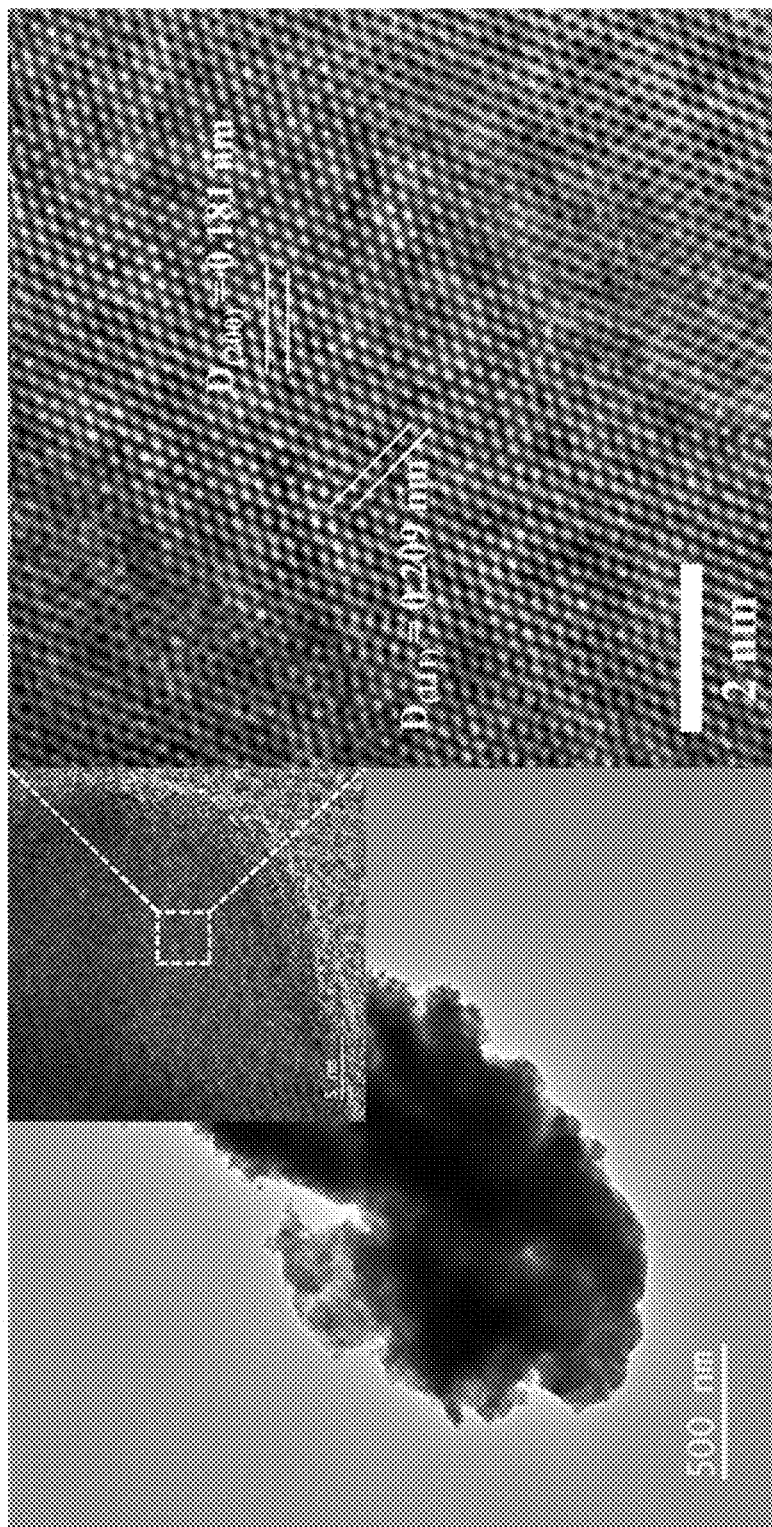
FIG. 4 is a TEM (Transmission Electron Microscope) image of the five-element high entropy alloy catalyst of the experimental example 3.

FIG. 3 is an SEM image of a five-element high entropy alloy catalyst of the experimental example 3. FIG. 4 is a TEM image of the five-element high entropy alloy catalyst of the experimental example 3. From FIG. 3, we can clearly see that the formed five-element high entropy alloy catalyst has a great number of dendrite structures. Additionally, as shown in FIG. 4, the formed five-element high entropy alloy catalyst is of an FCC (face-centered cubic packing) structure, the interplanar spacing of a plane (111) is 0.209 nm, and the interplanar spacing of a plane (220) is 0.181 nm.

Experimental Example 4

A nickel foam (with a pore density being 100 PPI) is put into the aqueous electrolyte containing the six-element high entropy alloy precursor. Various high entropy alloy precursors in the aqueous electrolyte are respectively manganese chloride (0.4 M), ferric chloride (0.3 M), cobalt chloride (0.05 M), nickel chloride (0.5 M), cupric chloride (0.002 M) and ammonium molybdate (0.02 M), and additionally, sodium citrate (0.4 M) is added to be used as the chelating agent.

The pH value of the electrolyte is regulated to 9 by ammonium hydroxide. A two-electrode electroplating method is used for performing pulse electroplating, wherein a current density is 4 A/cm$^2$, an electroplating cycle number is 3000, the electroplating on time is 0.2 second, and the current off time is 0.8 second. After the electroplating is completed, deionized water and acetone are used for cleaning a test block.

Figure 5:
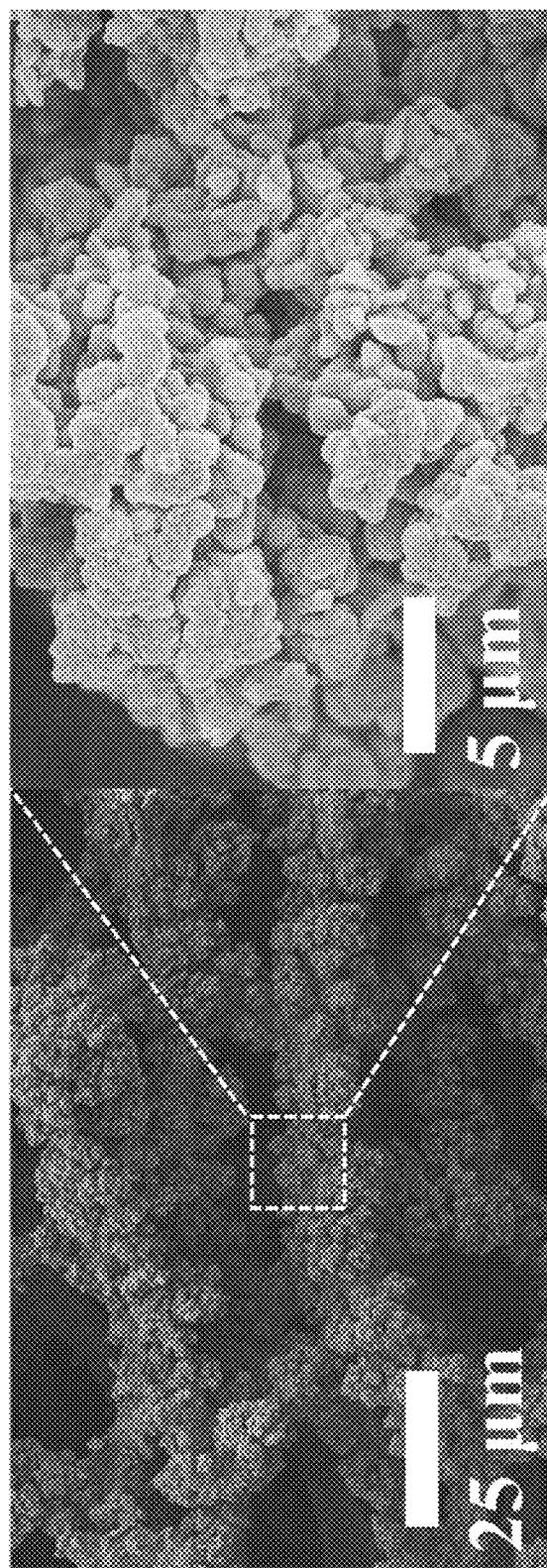
FIG. 5 is an SEM image of a six-element high entropy alloy catalyst of an experimental example 4.
Figure 6:
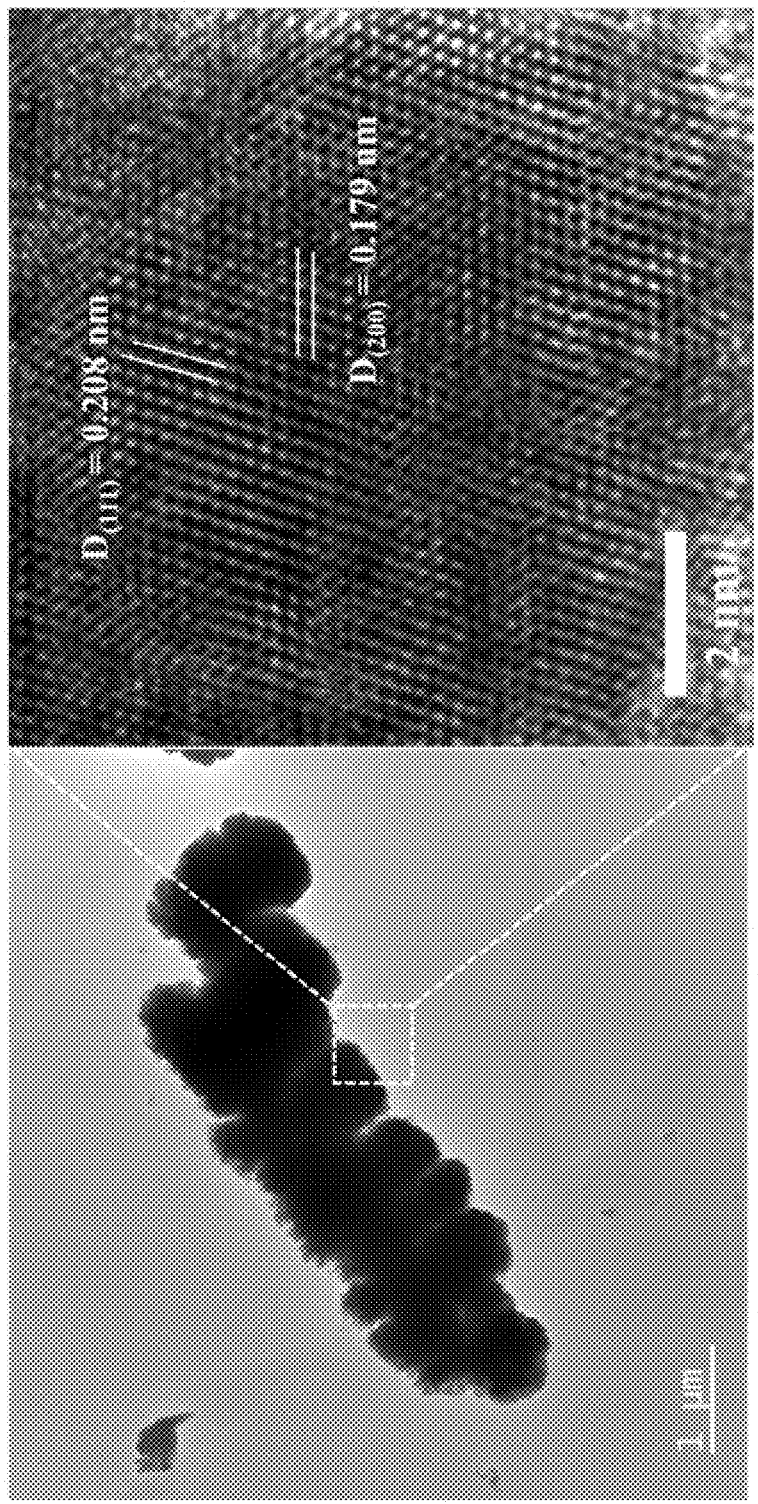
FIG. 6 is a TEM image of the six-element high entropy alloy catalyst of the experimental example 4.

FIG. 5 is an SEM image of a six-element high entropy alloy catalyst of the experimental example 4. FIG. 6 is a TEM photo of the six-element high entropy alloy catalyst of the experimental example 4. From FIG. 5, we may clearly see that the formed six-element high entropy alloy has a great number of dendrite structures. Additionally, as shown in FIG. 6, the formed six-element high entropy alloy is of an FCC structure, the interplanar spacing of a plane (111) is 0.208 nm, and the interplanar spacing of a plane (200) is 0.179 nm.

Although the present invention has been described with reference to the above embodiments, the embodiments are not intended to limit the present invention. Any person skilled in the art may make variations and improvements without departing from the spirit and scope of the present invention. Therefore, the protection scope of the present invention should be subject to the appended claims.

What is claimed is:

1. A method for electrolysis of water, comprising using a high entropy alloy as a catalyst,
    wherein the high entropy alloy comprises iron, cobalt, nickel, copper and molybdenum, and based on a total mole number of the high entropy alloy, a content of each of iron, cobalt, nickel, copper and the molybdenum is in a range of 5 to 35 at. %, or
    wherein the high entropy alloy comprises manganese, iron, cobalt, nickel, copper and molybdenum, and based on a total mole number of the high entropy alloy, a content of each of manganese, iron, cobalt, nickel, copper and molybdenum is in a range of 5 to 35 at. %.

2. The method for electrolysis of water according to claim 1, wherein a water solution with a pH value of 7 to 14 is used as an electrolyte for application of an anode.

3. The method for electrolysis of water according to claim 1, wherein a water solution with a pH value of 0 to 14 is used as an electrolyte for application of a cathode.

\* \* \* \* \*